United States Patent

Jakobi

[15] 3,683,605
[45] Aug. 15, 1972

[54] RELEASABLE CUTTER PLATFORM FOR A SELF-PROPELLED COMBINE HARVESTER

[72] Inventor: Wilhelm Jakobi, Saulgau-Bogenweiler, Germany

[73] Assignee: Josef Bautz GmbH, Saulgau, Germany

[22] Filed: Jan. 29, 1970

[21] Appl. No.: 6,669

[30] Foreign Application Priority Data

Feb. 1, 1969 Germany..........P 19 05 035.2

[52] U.S. Cl.....................56/228, 56/15.6, 56/DIG. 9
[51] Int. Cl.............................................A01d 75/22
[58] Field of Search..........56/15.6, 228, DIG. 9, 14.9; 172/240

[56] References Cited

UNITED STATES PATENTS

| 3,483,680 | 12/1969 | Noack | 56/228 X |
| 336,948 | 3/1886 | Robbins | 56/228 X |
| 2,833,105 | 5/1958 | Naery | 56/228 |
| 3,279,158 | 10/1966 | Kirkpatrick et al. | 56/228 |
| 3,488,930 | 1/1970 | Gorsler et al. | 56/DIG. 9 |

*Primary Examiner*—Louis G. Mancene
*Assistant Examiner*—J. A. Oliff
*Attorney*—Michael S. Striker

[57] ABSTRACT

A cutter platform for a combine harvester in which the cutter platform is provided with its own wheels for transporting the cutter platform during travel over roads. The wheels of the cutter platform are movable to an inactive position when the cutter platform is in working position fastened to the front end of the combine harvester.

2 Claims, 2 Drawing Figures

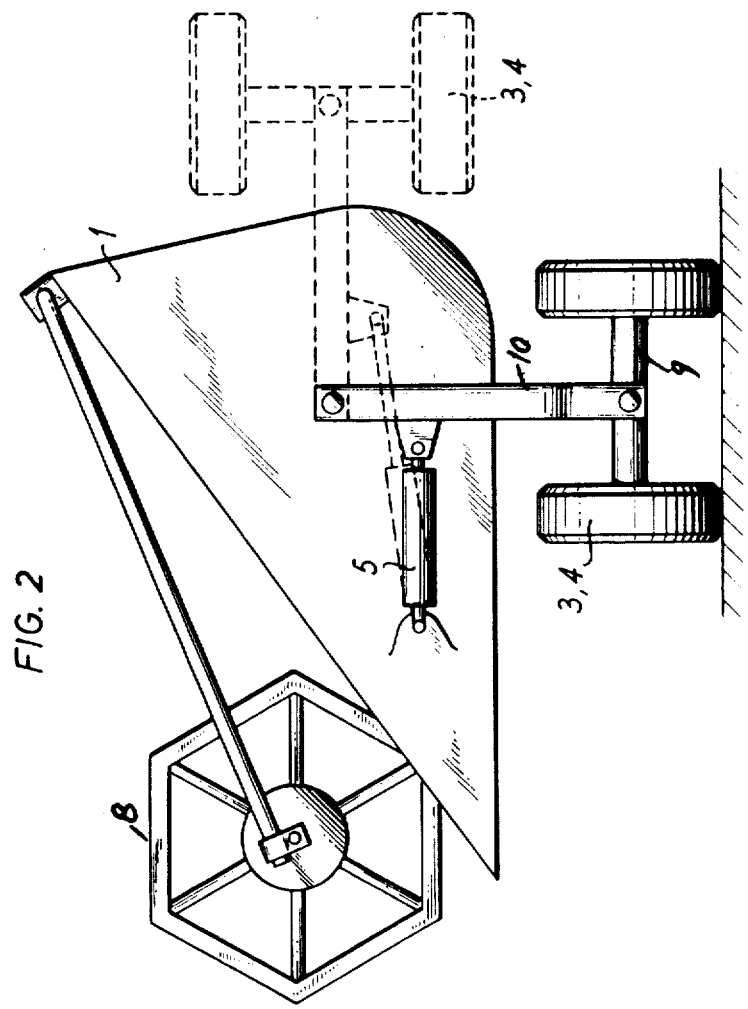

RELEASABLE CUTTER PLATFORM FOR A SELF-PROPELLED COMBINE HARVESTER

BACKGROUND OF THE INVENTION

The present invention relates to a releasable cutter platform for self-propelled combine harvesters. It is known to releasably connect a cutter platform to the front end of a combine harvester and to load such a cutter platform during travel of the combine over roads on a special carriage which is hitched to the combine and drawn by the latter while the combine travels from one to another place of use over roads.

A disadvantage of such an arrangement is that the transporting carriage cannot be connected to the combine during use of the latter for harvesting and threshing, that is the transporting carriage for the cutter platform has to be located somewhere at the edge of the fields which is to be harvested. This is of special disadvantage if the combine harvester is rented out to different people in which case the combine may have to travel during a working day from one to another field to be harvested so that the cutter platform has to be during a working day several times loaded onto the transporting carriage, which requires that the mobile combine after having finished harvesting one field has to travel from the end of this field to the location at which the transporting carriage has been left, which is usually at the other end of the field, so that considerable time is lost in this way. Additional time is lost due to the fact that the cutter platform after being released from the front end of the combine has to be loaded onto the transporting carriage which also entails a considerable effort on the part of the operator.

SUMMARY OF THE INVENTION

It is an object of the present invention to provide for an arrangement by means of which the cutter platform may be hitched in an expedient manner to the rear end of a combine harvester after release of the cutter platform from the front end of the combine and without the necessity of providing an additional transporting carriage for supporting the cutter platform during travel together with the combine over roads.

It is a further object of the present invention to provide for such an arrangement which is simple in construction so that it may be produced at reasonable cost and work trouble-free during extended use.

With these objects in view, the present invention comprises a cutter platform releasably connectable to the front end of a harvester combine, wheel means permanently connected to the cutter platform for movably supporting the latter during travel of the combine harvester over a road, which wheel means are movable between a lowered active position located beneath the cutter platform for supporting the latter during travel over a road and a raised inactive position located rearwardly of the platform when the latter is connected to the front end of the harvester combine during operation of the latter.

Means are connected to the cutter platform and the wheel means for moving the latter between the aforementioned positions thereof and such moving means preferable comprise fluid operated cylinder and piston means. The arrangement may also include a coupling rod permanently connected to the combine harvester and the cutter platform in such a manner to permit mounting of the cutter platform in a working position to the front end of the combine harvester and a traveling position for travel over roads in which the cutter platform is located rearwardly of the combine harvester to be pulled by the latter.

The advantage of such an arrangement is that the cutter platform and the mobile combine harvester form a unit in which the change of the cutter platform from a working position to a traveling position and vice versa can be carried out in a very simple and quick manner.

The novel features which are considered as characteristic of the invention are set forth in particular in the appended claims.

The improved apparatus, itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a schematic side view of the cutter platform and showing the wheel means connected thereto in full lines in a lowered active position and in dotted lines in a raised inactive position.

DESCRIPTION OF THE PREFERRED EMBODIMENTS

Figure 1:
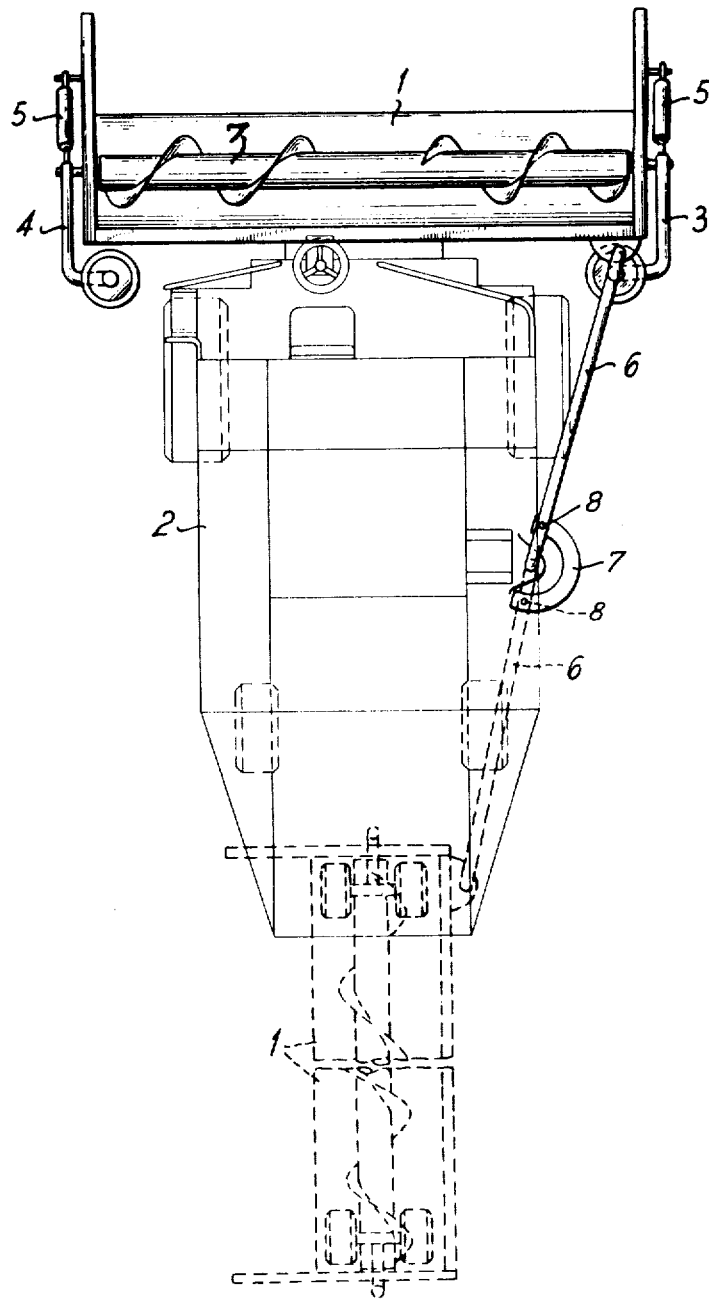
FIG. 1 is a schematic top view illustrating the cutter platform in full lines in working position attached to the front end of a combine harvester and also showing in dotted lines the cutter platform hitched to the combine harvester for traveling with the latter over roads.

FIG. 1 schematically illustrates a cutter platform 1 releasably attached in a manner well known in the art and not forming part of the present invention to the front end of a mobile combine harvester 2. The cutter platform carries, as usual, a transporting auger 7 and a gathering wheel 8 (FIG. 2) rotatable about their axes, whereas the reciprocating cutter mounted at the front edge of the cutter platform is not shown in the drawing. According to the present invention, the cutter platform is provided with its own wheel means 3, 4 which may comprise two pairs of wheels respectively mounted on a pair of axle means 9 for turning movement about axes extending normal to the axis of the auger 7. The wheel means 3, 4 are connected to the cutter platform 1 for movement between a lowered active position, shown in full lines in FIG. 2, for supporting the cutter platform 1 during travel over roads, and a raised inactive position, as shown in dotted lines in FIG. 2 and in full lines in FIG. 1, in which the wheel means are located laterally and rearwardly of the cutter platform 1 during connection of the latter in working position to the front end of the combine 2.

The arrangement includes further means for moving the wheel means 3, 4 between the positions thereof, and these means may comprise a pair of elongated members or arms 10 each fixedly connected at one end to a respective one of the pair of axle means 9 and tiltably connected at the other end to the cutter platform, and a pair of fluid operated cylinder and piston means 5 each connected at one end to the cutter platform 1 and at the other end thereof to a portion of a respective one of the pair of elongated arms 10 between the opposite ends of the latter.

For travel over roads, the cutter platform may be completely disconnected from the mobile combine harvester, or, according to a further feature of the present invention, a coupling rod 6 may be provided which permanently connects the cutter platform 1 to the combine harvester 2 while permitting movement of the cutter platform from a working position fastened in transverse position to the front end of the combine harvester and a traveling position extending in longitudinal direction rearwardly of the combine harvester and fastened thereto. As shown in FIG. 1, the coupling rod 6 is at one end pivotally connected in the region of one end to the cutter platform 1 whereas the other end of the coupling rod is pivotally connected to a lateral portion of the combine harvester substantially midway between opposite ends of the latter so that the cutter platform 1 may be moved after release from the front end of the combine 2 from the position shown in full lines in FIG. 1 to the position shown in dotted lines whereby the coupling rod 6 during travel of the combine and the cutter platform over roads forms a wagon tongue.

If desired, a locking device 7 may be provided on the harvester combine 2, to lock the coupling rod 6, in the drawing position shown in dotted lines in FIG. 1, by means of pins 8 in a position inclined at an angle to the longitudinal axis of the combine.

It will be understood that each of the elements described above, or two or more together, may also find a useful application in other types of a cutter platform for a combine harvester in which the cutter platform is provided with its own wheel means differing from the types described above.

While the invention has been illustrated and described as embodied in a cutter platform for a combine harvester in which the cutter platform is provided with its own wheel means which are movable between a lowered active position for supporting the cutter platform during travel over roads and a raised inactive position, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be protected by Letters Patent is:

1. In a self-propelled combine harvester, a combination comprising a cutter platform releasably connectable to the combine harvester; wheel means permanently connected to said cutter platform and movable between a lowered active position located beneath said cutter platform for supporting the latter during travel over a road, and a raised inactive position located rearwardly of said platform when the latter is connected to the front end of the combine harvester during operation of the combine harvester; means connected to said cutter platform and said wheel means for moving the latter between said positions thereof; and a coupling rod permanently connecting said cutter platform to said combine harvester while permitting movement of said cutter platform from a working position fastened in transverse position to the front end of the combine harvester and a traveling position extending in longitudinal direction rearwardly of the combine harvester.

2. A combination as defined in claim 1, wherein said coupling rod is at one end pivotally connected in the region of one end of said cutter platform to the latter, whereas the other end of said coupling rod is pivotally connected to a lateral portion of the harvester combine substantially midway between opposite ends thereof.

* * * * *